United States Patent
Xu et al.

(10) Patent No.: US 10,256,855 B2
(45) Date of Patent: Apr. 9, 2019

(54) INTERFERENCE MANAGEMENT INFORMATION SIGNALING

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US); Tao Luo, San Diego, CA (US); Arumugam Chendamarai Kannan, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 345 days.

(21) Appl. No.: 14/594,577

(22) Filed: Jan. 12, 2015

(65) Prior Publication Data

US 2015/0222304 A1    Aug. 6, 2015

Related U.S. Application Data

(60) Provisional application No. 61/934,652, filed on Jan. 31, 2014.

(51) Int. Cl.
*H04B 1/10* (2006.01)
*H04B 1/04* (2006.01)
(Continued)

(52) U.S. Cl.
CPC ............. *H04B 1/10* (2013.01); *H04B 1/0475* (2013.01); *H04J 11/005* (2013.01);
(Continued)

(58) Field of Classification Search
CPC ..... H04B 1/10; H04B 1/0475; H04J 11/0023; H04J 11/005; H04L 5/00; H04W 24/02;
(Continued)

(56) References Cited

U.S. PATENT DOCUMENTS

| | | | | |
|---|---|---|---|---|
| 2002/0136193 A1* | 9/2002 | Chang | ................. | H04W 52/262 370/347 |
| 2003/0185159 A1* | 10/2003 | Seo | ....................... | H04L 1/0026 370/278 |

(Continued)

FOREIGN PATENT DOCUMENTS

WO    WO-2013151277 A1    10/2013

OTHER PUBLICATIONS

"3rd Generation Partnership Project; Technical Specification Group Radio Access Network; Evolved Universal Terrestrial Radio Access (E-UTRA) and Evolved Packet Core (EPC); User Equipment (UE) Conformance Specification Part 3: Test Suites (Release 11)", 3GPP Standard; 3GPP TS 36.523-3, 3rd Generation Partnership Project (3GPP), Mobile Competence Centre ; 650, Route Des Lucioles ; F-06921 Sophia-Antipolis Cedex ; France, vol. RAN WG5, No. V11.2.0, Dec. 12, 2013 (Dec. 12, 2013), pp. 68-147, XP050729018.

(Continued)

*Primary Examiner* — Jenee Holland
(74) *Attorney, Agent, or Firm* — Anthony R. Morris

(57) ABSTRACT

Certain aspects of the present disclosure relate to techniques and apparatus for signaling interference management information, such as network assisted interference cancelation (NAIC) information as downlink control information (DCI). According to certain aspects, a method is provided for wireless communications by an interfering or potentially interfering base station. The method generally includes generating information for use by a user equipment (UE) in performing interference mitigation when processing a signal (Continued)

from a serving base station and transmitting the information to the UE. The method may further include generating an indication of how the interfering or potentially interfering base station transmits the information and how one or more cells transmit information for use by the UE in performing interference mitigation when processing a signal from the serving base station and transmitting the indication to the UE.

44 Claims, 9 Drawing Sheets

(51) Int. Cl.
   H04L 5/00       (2006.01)
   H04W 72/08      (2009.01)
   H04W 72/04      (2009.01)
   H04J 11/00      (2006.01)
   H04W 24/02      (2009.01)
(52) U.S. Cl.
   CPC ........ H04J 11/0023 (2013.01); H04L 5/0053 (2013.01); H04W 24/02 (2013.01); H04W 72/042 (2013.01); H04W 72/082 (2013.01); H04L 5/001 (2013.01); H04L 5/0035 (2013.01); H04L 5/0048 (2013.01)
(58) Field of Classification Search
   CPC .................. H04W 28/048; H04W 72/042; H04W 72/082
   See application file for complete search history.

(56) References Cited

U.S. PATENT DOCUMENTS

| | | | |
|---|---|---|---|
| 2004/0072567 A1* | 4/2004 | Cao ............ | H04W 36/18 455/442 |
| 2004/0098458 A1* | 5/2004 | Husain ......... | H04L 41/0803 709/204 |
| 2004/0165528 A1* | 8/2004 | Li ............. | H04L 12/4641 370/230 |
| 2006/0104370 A1* | 5/2006 | Yamanaka ...... | H04L 1/0003 375/242 |
| 2008/0080456 A1* | 4/2008 | Williams ....... | H04L 69/28 370/342 |
| 2009/0170509 A1* | 7/2009 | Cai ............ | H04L 1/0003 455/434 |
| 2009/0300456 A1* | 12/2009 | Pelletier ...... | H04L 1/1812 714/749 |
| 2010/0034152 A1* | 2/2010 | Imamura ........ | H04L 5/0007 370/329 |
| 2010/0254328 A1* | 10/2010 | McBeath ........ | H04L 1/1812 370/329 |
| 2011/0103287 A1* | 5/2011 | Ma ............. | H04B 7/0639 370/312 |
| 2012/0218968 A1* | 8/2012 | Kim ............ | H04B 7/024 370/329 |
| 2012/0281566 A1* | 11/2012 | Pelletier ...... | H04W 76/27 370/252 |
| 2013/0279437 A1* | 10/2013 | Ng ............. | H04W 48/16 370/329 |
| 2013/0324117 A1 | 12/2013 | Kim et al. | |
| 2014/0092829 A1* | 4/2014 | Han ............ | H04L 5/0053 370/329 |
| 2014/0204819 A1* | 7/2014 | Ohta ........... | H04L 5/0053 370/311 |
| 2014/0334440 A1* | 11/2014 | Wong ........... | H04W 36/0011 370/331 |
| 2014/0362769 A1* | 12/2014 | Chen ........... | H04J 11/0053 370/328 |
| 2015/0029958 A1* | 1/2015 | Park ........... | H04L 5/0053 370/329 |
| 2015/0078303 A1* | 3/2015 | Jongren ........ | H04L 1/0026 370/329 |
| 2015/0103800 A1* | 4/2015 | Seo ............ | H04W 56/00 370/330 |
| 2015/0173102 A1* | 6/2015 | Ruiz Delgado .. | H04L 1/1812 370/280 |

OTHER PUBLICATIONS

Alcatel-Lucent et al., "Signalling of Network Assistance Information in NAICS," 3GPP Draft; R1-134236—REL-12 NAISC—Signaling of Na Info V0.3, 3rd Generation Partnership Project (3GPP), Mobile Competence Centre ; 650, Route Des Lucioles ; F-06921 Sophia-Antipolis Cedex; Franc, vol. RAN WG1, No. Guangzhou, China; Oct. 7, 2013-Oct. 11, 2013, Sep. 28, 2013 (Sep. 28, 2013), XP050717418, 3 pages.

Ericsson: "On Signaling and Coordination Aspects of NAICS", 3GPP Draft; R1-135772, 3rd Generation Partnership Project (3GPP), Mobile Competence Centre ; 650, Route Des Lucioles ; F-06921 Sophia-Antipolis Cedex ; France vol. RAN WG1, No. San Francisco, USA; Nov. 11, 2013-Nov. 15, 2013 Nov. 2, 2013 (Nov. 2, 2013), pp. 1-3, XP050751220, Retrieved from the Internet: URL:http://www.3gpp.org/ftp/tsg_ran/WG1_RL1/TSGR1_75/Docs/R1-135772.zip.

Etri: "Signalling for NAICS", 3GPP Draft; R1-135280 NAICS, 3rd Generation Partnership Project (3GPP), Mobile Competence Centre; 650, Route Des Lucioles; F-06921 Sophia-Antipolis Cedex; France , vol. RAN WG1, No. San Francisco, CA, USA; Nov. 11, 2013-Nov. 15, 2013, Nov. 13, 2013 (Nov. 13, 2013), XP050734974, 4 pages.

Intel Corporation: "Discussion on Network Signaling for NAICS Receivers", 3GPP Draft; R1-135125 Discussion on Network Signaling for NAICS Receivers, 3rd Generation Partnership Project (3GPP), Mobile Competence Centre ; 650, Route Des Lucioles ; F-06921 Sophia-Antipolis Cede vol. RAN WG1, No. San-Francisco, USA; Nov. 11, 2013-Nov. 15, 2013 Nov. 2, 2013 (Nov. 2, 2013), pp. 1-4, XP050750759, Retrieved from the Internet: URL:http://www.3gpp.org/ftp/tsg_ran/WG1_RL1/TSGR1_75/Docs/R1-135125.zip.

International Search Report and Written Opinion—PCT/US2015/011343—ISA/EPO—dated Jun. 29, 2015.

LG Electronics: "Considerations on Network Coordination and Signaling for NAICS", 3GPP Draft; R1-135493, 3rd Generation Partnership Project (3GPP), Mobile Competence Centre ; 650, Route Des Lucioles ; F-06921 Sophia-Antipolts Cedex ; France vol. RAN WG1, No. San Francisco, USA; Nov. 11, 2013-Nov. 15, 2013 Nov. 13, 2013 (Nov. 13, 2013), pp. 1-4, XP050735166, Retrieved from the Internet: URL:http://www.3gpp.org/ftp/tsg_ran/WG1_RL1/TSGR1_75/Docs/R1-135493.zip.

Panasonic: "Signalling mechanisms for interference information", 3GPP Draft; R1-135401, 3rd Generation Partnership Project (3GPP), Mobile Competence Centre ; 650, Route Des Lucioles F-06921 Sophia-Antipolis Cedex; France, vol. RAN WG1, No. San Francisco, USA; Nov. 11, 2013-Nov. 15, 2013 Nov. 1, 2013 (Nov. 11, 2013), XP050750643, 4 pages.

Partial International Search Report—PCT/US2015/011343—ISA/EPO—dated Apr. 8, 2015.

Pedersen K.I., et al., "Carrier aggregation for LTE-advanced: functionality and performance aspects", IEEE Communications Magazine, IEEE Service Center, Piscataway, US, vol. 49, No. 6, Jun. 1, 2011 (Jun. 1, 2011), pp. 89-95, XP011355182, ISSN: 0163-6804, DOI:10.1109/MCOM.2011.5783991.

Alcatel-Lucent et al., "On Macro-assisted Interference Suppression/Cancellation", 3GPP Draft, R1-132036—REL-12 UMTS HETNET—On Macro-assisted Interference Cancellation V0.2, 3$^{rd}$ Generation Partnership Project (3GPP), Mobile Competence Centre, 650, Route Des Lucioles, F-06921, RAN WG1, Fukuoka, Japan, May 20, 2013-May 24, 2013, May 11, 2013 (May 11, 2013), pp. 1-3, XP050697819, Retrieved from the Internet: URL: http://www.3gpp.org/ftp/tsg_ran/WG1_RL1/TSGR1_73/Docs/ [retrieved on May 11, 2013].

(56) References Cited

OTHER PUBLICATIONS

MediaTek Inc., "Email Discussion Summary on NAICS Receiver Assumption, Complexity," 3GPP TSG-RAN WG4#68bis, R4-135089, Sep. 30, 2013, pp. 1-17.
NSN, Nokia, "On the NAICS System and Specification Impact," 3GPP TSG-RAN WG1#75, R1-135838, Nov. 13, 2013, pp. 1-5.

* cited by examiner

INTERFERENCE MANAGEMENT INFORMATION SIGNALING

CROSS-REFERENCE TO RELATED APPLICATION(S)

This application claims benefit of U.S. Provisional Patent Application Ser. No. 61/934,652, filed Jan. 31, 2014, which is herein incorporated by reference in its entirety.

BACKGROUND

Field of the Disclosure

The present disclosure relates generally to wireless communication, and more particularly, to techniques and apparatus for signaling information for interference management such as network assisted interference cancellation (NAIC) signaling.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide apparatus, methods, processing systems, and computer program products for signaling information for interference management, such as network assisted interference cancellation (NAIC) signaling.

Certain aspects of the present disclosure provide a method for wireless communications by an interfering or potentially interfering base station (BS). The method generally includes generating information for use by a user equipment (UE) in performing interference mitigation when processing a signal from a serving BS and transmitting the information to the UE.

Certain aspects of the present disclosure provide a method for wireless communications by a UE. The method generally includes monitoring for information from at least one of an interfering or potentially interfering BS or one or more cells, receiving a signal from a serving BS, and performing interference mitigation based on the information to process the signal.

Certain aspects of the present disclosure provide an apparatus for wireless communications by an interfering or potentially interfering BS. The apparatus generally includes means for generating information for use by a UE in performing interference mitigation when processing a signal from a serving BS and means for transmitting the information to the UE.

Certain aspects of the present disclosure provide an apparatus for wireless communications by a UE. The apparatus generally includes means for monitoring for information from at least one of an interfering or potentially interfering BS or one or more cells, means for receiving a signal from a serving BS, and means for performing interference mitigation based on the information to process the signal.

Certain aspects of the present disclosure provide an apparatus for wireless communications by an interfering or potentially interfering BS. The apparatus generally includes at least one processor configured to: generate information for use by a UE in performing interference mitigation when processing a signal from a serving BS, and transmit the information to the UE; and a memory coupled with the at least one processor.

Certain aspects of the present disclosure provide an apparatus for wireless communications by a UE. The apparatus generally includes at least one processor configured to: monitor for information from at least one of an interfering or potentially interfering BS or one or more cells, receive a signal from a serving BS, and perform interference mitigation based on the information to process the signal; and a memory coupled with the at least one processor.

Certain aspects of the present disclosure provide a computer readable having instructions stored thereon for wireless communications by an interfering or potentially interfering BS. The instructions generally includes instructions for generating information for use by a UE in performing interference mitigation when processing a signal from a serving BS, and transmitting the information to the UE.

Certain aspects of the present disclosure provide a computer readable having instructions stored thereon for wireless communications by a UE. The instructions generally include instructions for monitoring for information from at least one of an interfering or potentially interfering BS or one or more cells, receiving a signal from a serving BS, and performing interference mitigation based on the information to process the signal.

Certain aspects of the present disclosure provide a method for wireless communications by an interfering or potentially interfering BS. The method generally includes generating an indication of how one or more cells transmit NAIC information for use by a UE in performing interference cancelation or suppression when processing a signal from a serving base station and transmitting the indication to the UE.

Certain aspects of the present disclosure provide a method for wireless communications by a UE. The method generally includes receiving an indication of how one or more cells transmit NAIC information, using the indication to monitor the one or more cells to obtain the NAIC information, and performing interference cancelation or suppression when processing a signal from a serving base station using the NAIC information.

Certain aspects of the present disclosure provide an apparatus for wireless communications by a interfering or potentially interfering base station. The method generally includes generating NAIC information and transmitting the NAIC information as downlink control information (N-DCI) to a UE served by a serving base station for use in performing interference cancelation or suppression when processing a signal from the serving base station.

Certain aspects of the present disclosure provide a method for wireless communications by a UE. The method generally includes receiving NAIC information as N-DCI from an interfering or potentially interfering BS and performing interference cancelation or suppression when processing a signal from a serving BS using the NAIC information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
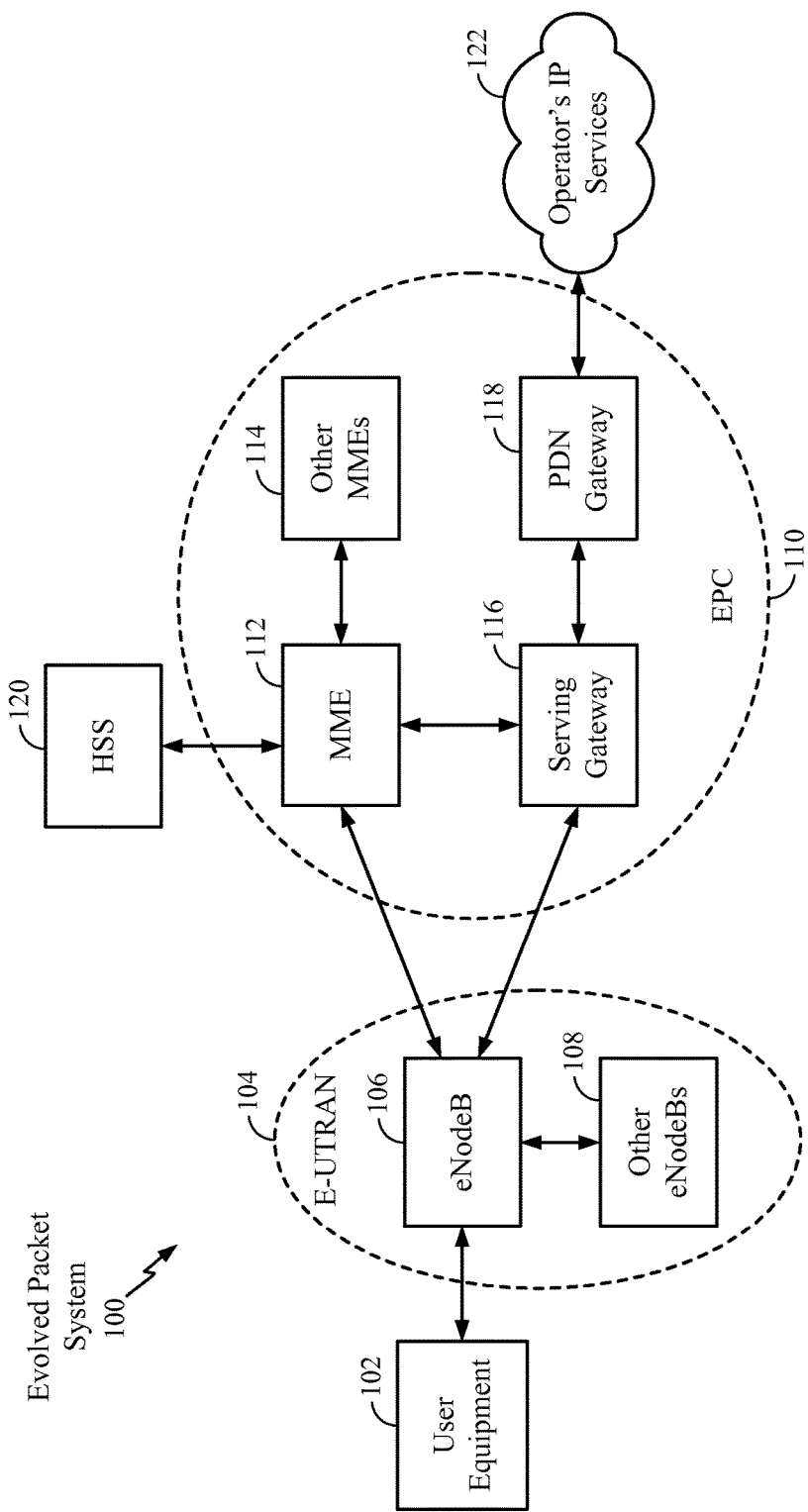
FIG. 1 is a diagram illustrating an example of a network architecture, in accordance with certain aspects of the disclosure.

The present disclosure relates to signaling (e.g., dynamic signaling) information for interference management, such as network assisted interference cancellation (NAIC) signaling. Techniques and apparatus are provided herein for signaling information to the UE. For example, aspects include signaling multiple downlink control information (DCI) with different information content, by compression for resource allocation signaling, and reduced bits for modulation and transmission modes signaling. In aspects, the signaling may be dynamic signaling, semi-static signaling and/or static signaling. In aspects, the signaling may be broadcast, multicast and/or unicast signaling. However, different types of signaling may be employed.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Communications System

FIG. 1 is a diagram illustrating an example network architecture 100 in which aspects of the present disclosure may be practiced. For example, eNB 106 may generate network assisted interference cancelation (NAIC) information and may transmit the information to the UE 100 as downlink control information (DCI). The eNB 106 may generate an indication of how at least one of the eNB 106 or neighbor cells transmit DCI, and transmit the indication to the UE 110. The UE 110 may monitor for DCI and perform interference mitigation based on the DCI.

The network architecture 100 may be, for example, a long term evolution (LTE) architecture and may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
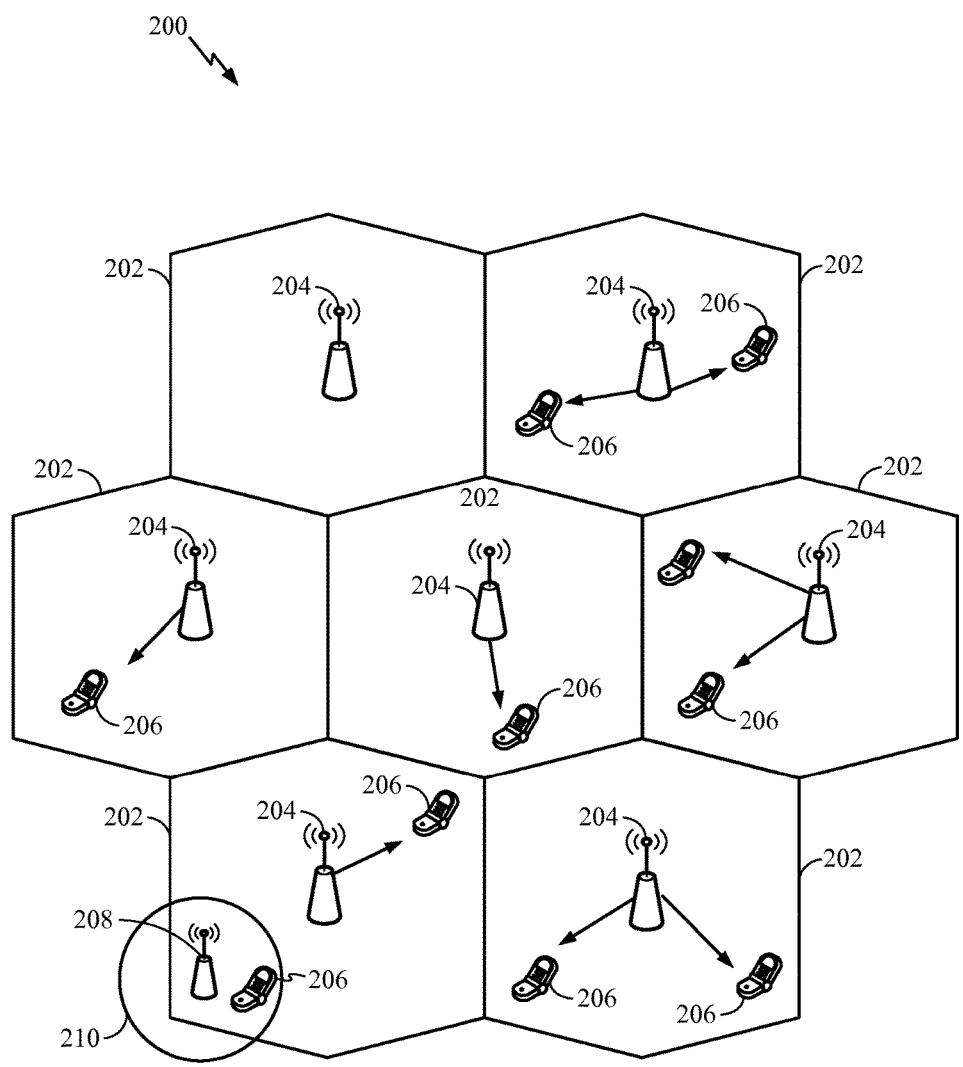
FIG. 2 is a diagram illustrating an example of an access network, in accordance with certain aspects of the disclosure.

FIG. 2 is a diagram illustrating an example of an access network 200 in which aspects of the present disclosure may be practiced. For example, UE 206 may perform the operations 800 and 1000 illustrated in FIGS. 8 and 10, respectively, and macro eNB 204 or lower power class eNBs 208 may perform the operations 700 and 900 illustrated in FIGS. 7 and 9, respectively.

For example, eNB 204 may generate NAIC information and may transmit the information to the UE 206 as DCI. The eNB 204 may generate an indication of how at least one of the eNB 204 or neighbor cells (e.g., eNB 208 or cellular region 210) transmit DCI, and transmit the indication to the UE 206. The UE 206 may monitor for DCI and perform interference mitigation based on the DCI.

The example access network 200 may be, for example, an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
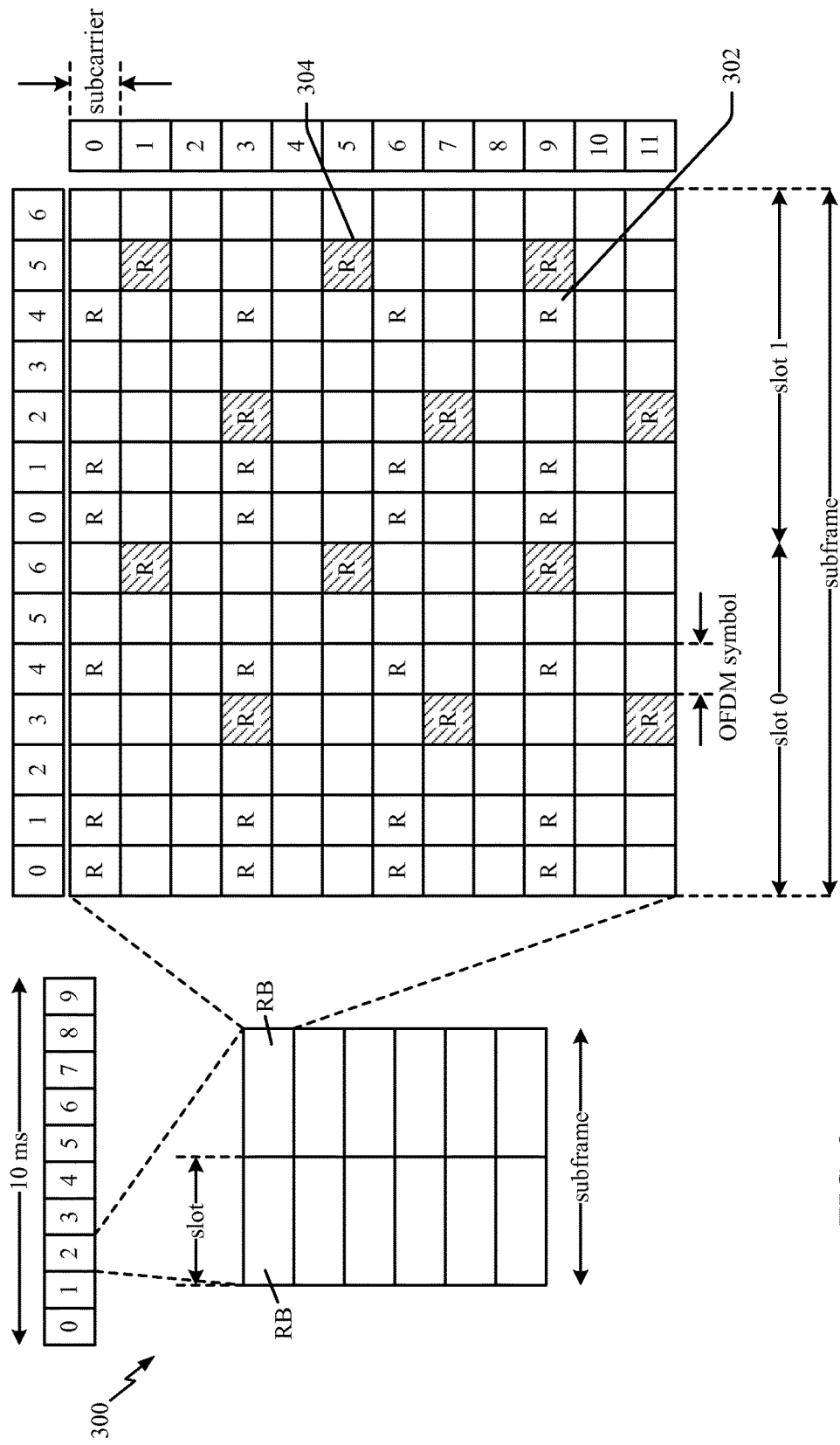
FIG. 3 is a diagram illustrating an example of a downlink (DL) frame structure in long term evolution (LTE), in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
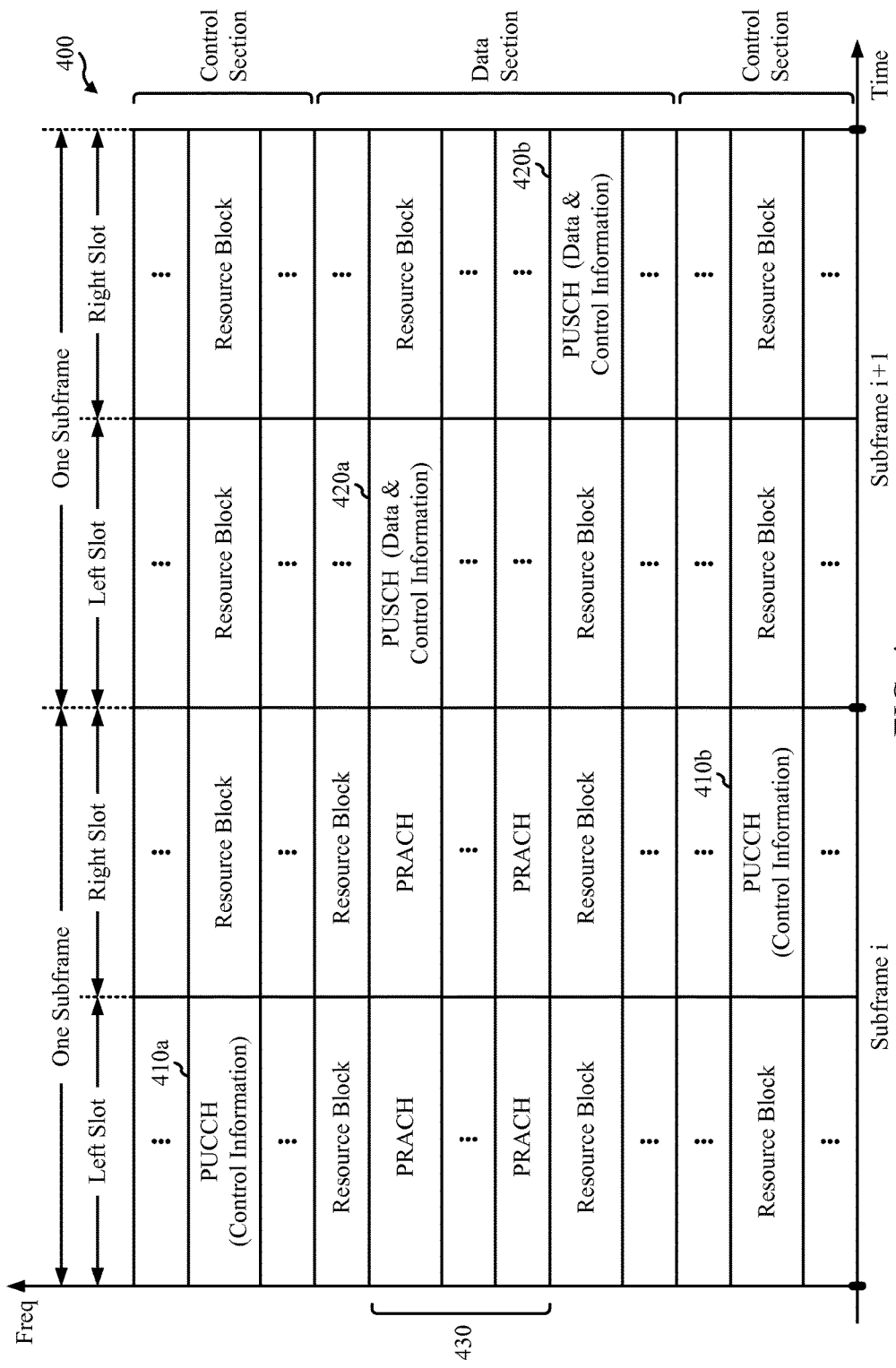
FIG. 4 is a diagram illustrating an example of an uplink (UL) frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
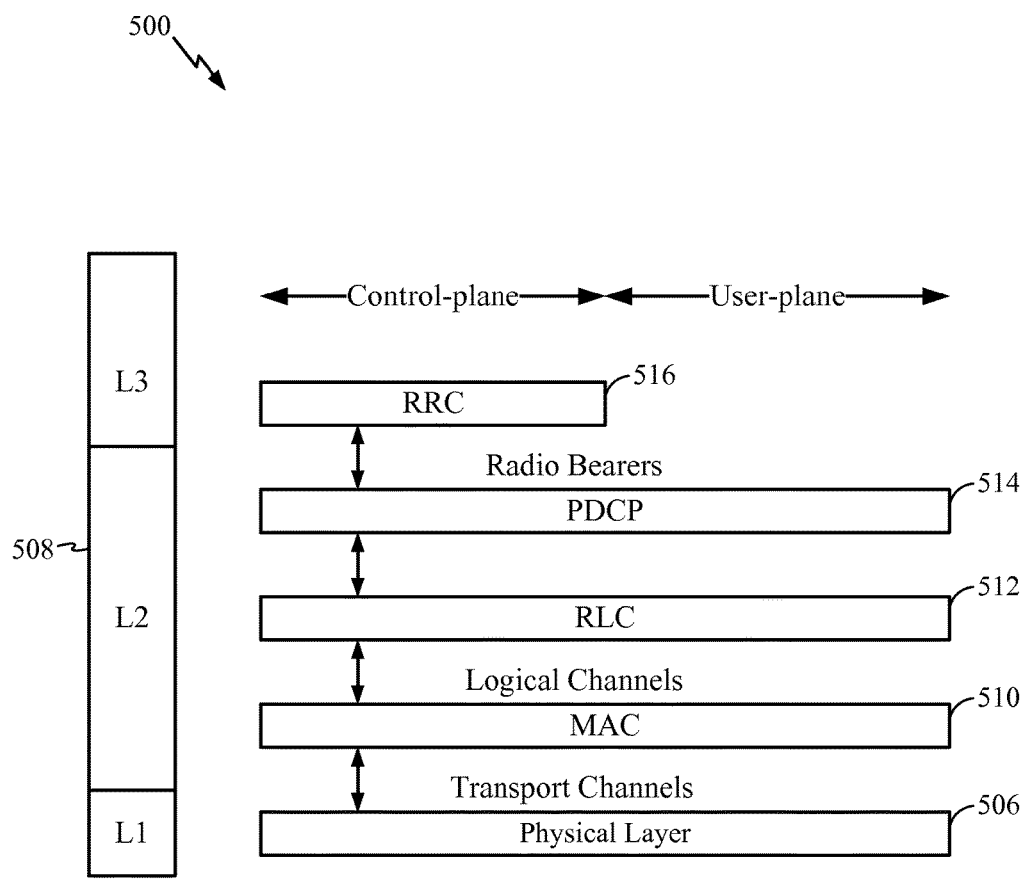
FIG. 5 is a diagram illustrating an example of a radio protocol architecture for the user plane and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
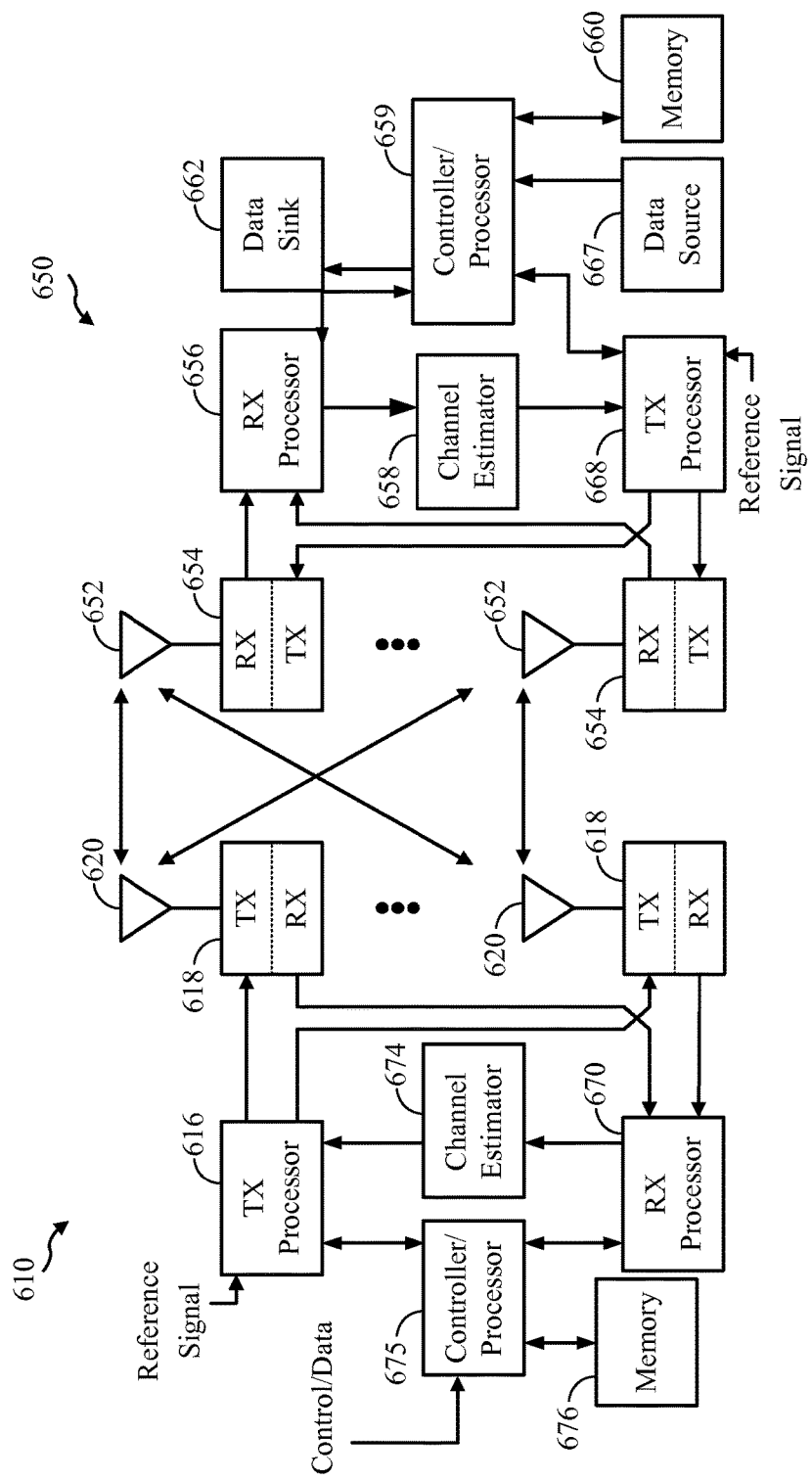
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network in which aspects of the present disclosure may be performed. For example, the controller/processor 659 and/or other processors and modules at the UE 650 may perform or direct operations for example operations 800 in FIG. 8 and example operations 1000 in FIG. 10 and/or other processes for the techniques described herein, for example. The controller/processor 675 and/or other processors and modules at the eNB 610 may perform or direct operations for example operations 700 in FIG. 7 and example operations 900 in FIG. 9 and/or other processes for the techniques described herein, for example. In aspects, one or more of any of the components shown in FIG. 6 may be employed to perform example operations 700, 800, 900, 1000 and/or other processes for the techniques described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Example Interference Management Information Signaling

Network assisted interference cancellation (NAIC) generally allows for the network to signal interference information to user equipments (UEs) to aid in interference mitigation, such as cancellation, for example, by reducing the workload at the UE. NAIC may be implemented, for example, on receivers supporting symbol level interference cancellation (SLIC), reduced complexity maximum likelihood (R-ML) receivers, enhanced minimum mean square error (E-MMSE-IRC) receivers, or receivers supporting codeword level interference cancellation (CWIC).

Advanced interference management techniques may involve interference suppression (IS), for example, by MMSE interference rejection and multi-user detection (MUD) by joint ML detection for desired signal and interferences. For SLIC, each tone may be treated independently and the coding scheme used to encode physical downlink shared channel (PDSCH) transmissions may be ignored. For each tone (e.g., symbol), the most likely transmitted bits may be estimated based on the employed spatial scheme and modulation format. An estimate of the interfering signal is then reconstructed accordingly. For CWIC, the coding scheme used by the interferer to transmit each PDSCH payload that the UE may desire to cancel may be taken into account (e.g., to exploit error-correction capabilities of Turbo-coding for PDSCH). Typically, the reconstructed interfering signal is more reliable in CWIC than in SLIC, for example, as long as reliable turbo decoding (e.g., under high signal interference to noise ratio (SINR)).

In order to perform advance receiver techniques (e.g., such as SLIC or CWIC), interference information may be signaled to the receiver. An advanced receiver may blindly detect certain parameters, such as modulation order, presence of an interferer, and/or precoding matrix of the interference. Additionally or alternatively, the eNB may signal interference information to the receiver.

NAIC signaling may be performed in a variety of manners. In some aspects, a serving cell supporting NAIC may perform semi-static signaling of interference information (e.g., via radio resource control (RRC) signaling of transmission mode, traffic-to-pilot (T2P) values, and/or virtual cell ID (VCID)). Alternatively, a serving cell can dynamically signal interference information, such as modulation order of the interferer, precoding matrices of the interferer, and/or resource block (RB) assignments, for example. In some aspects, the interfering cell may signal interference conditions to UEs communicating with a cell experiencing interference from the interfering cell.

In some aspects, a large number of parameters such as interference presence on a per resource block (RB) per subframe basis, transmission mode, precoding, rank, T2P of the interferer, etc. are signaled for network assistance. This may lead to signaling of many (e.g., hundreds) of bits which downlink control information (DCI) may not be able to handle.

For PDSCH resource allocation Type 0, downlink (DL) RBs may be split into RB groups (RBGs). For example, RBG 2 for 5 MHz, RBG 3 for 10 MHz, and RBG 4 for 20 MHz. The resource allocation may be signaled using a bit map (e.g., 28 bits for 110 RBs) to indicate which RBG is transmitted. The size of an RBG, P, may depend on the system bandwidth, $N_{RB}^{DL}$. For example, RBG size is 1 for $N_{RB}^{DL}$ equal or less than 10, RBG size is 2 for $N_{RB}^{DL}$ of 11-26, RBG size is 3 for $N_{RB}^{DL}$ of 27-63, RBG size is 4 for $N_{RB}^{DL}$ of 64-110.

For PDSCH resource allocation Type 1, the RBGs may be further grouped into subsets (e.g., 2, 3, or 4 subsets). The subset may be indicated to the UE, as well as a bit map indicating which RB is used for transmission within each of the RBGs in the subset. In some aspects, there is a possible addition shift within the subset.

PDSCH resource allocation Type 2 may employ localized virtual RBs (VRBs) and/or distributed VRBs. For localized VRBs, continuous RB allocations may be signaled in terms of starting RB and number of RBs. For distributed VRBs, RBs may be scattered across the frequency domain. Distributed VRBs may be used for DCI format 1C.

Typically, an eNB can schedule on a per RB basis. For example, for a 20 MHz system with 100 RBs, the eNB may use 100 bits to indicate which RB has interference or more than 100 bits if there is hopping within the subframe.

Thus, techniques for signaling large numbers of parameters for network assistance, configuring broadcast DCI for NAIC, resource allocation, and transmission scheme/transmission modes (TM) (e.g., conventionally, 10 TM are supported which may lead to complexity at the receiver if all TMs are blind decoded) for NAIC are desirable.

Techniques and apparatus are provided herein for signaling information to the UE. For example, in aspects, such signaling includes signaling multiple DCI with different information content, by compression for resource allocation signaling, and reduced bits for modulation and transmission modes signaling.

Example NAIC DCI (N-DCI) Configuration Indication

According to certain aspects, cells (e.g., such as cellular regions 202 or low power cell 208) may transmit information that a user equipment (UE) (e.g., such as UE 206) uses to perform interference mitigation (e.g., suppression or cancellation) when processing a signal from the UE's serving base station (e.g., macro eNB 204). For example, the cells may broadcast network assisted interference cancelation (NAIC) information as downlink control information (N-DCI). The UE may monitor for N-DCI in order to mitigate interference using the NAIC information obtained from the cells.

According to certain aspects, the UE may determine how many cells and which cells to monitor for N-DCI. The UE may be informed (e.g., by a serving cell or non-serving cell) about the configuration of the broadcast DCI by neighboring cells. For example, the UE may report M neighbor cells to the eNB, and the eNB may provide configurations of broadcast N-DCIs from N cells of the M neighbor cells (e.g., all or a subset of the M neighbor cells). The UE may then monitor K cells of the M neighbor cells (e.g., all or a subset of the M neighbor cells) for broadcast N-DCIs. The number of neighbor cells K monitored by the UE may depend, for example, on UE capability, blind decoding requirement, etc. To satisfy the total blind decoding requirements (e.g., no matter how big N is), the total blind decoding may remain fixed. Alternatively, N and/or K may also depend on quasi co-location information (e.g., based on a physical downlink shared channel (PDSCH) resource element (RE) mapping and quasi-co-location indicator (PQI) bit). The UE may determine which cell is the current serving cell and which cells are interfering cells.

According to certain aspects, the UE may autonomously identify which cells to monitor for N-DCI. For example, N-DCI configurations may be fixed or may be broadcasted by the cells in system information block (SIB).

Example Indication of Duration N-DCI is Valid

According to certain aspects, it may also be desirable for the UE to know how long the N-DCI (e.g., the NAIC information in the N-DCI) is valid. According to certain aspects, N-DCI may be valid only on the subframe it is received. Alternatively, the N-DCI may be valid on the subframe it is received and also valid for subsequent subframes. For example, the N-DCI may remain valid until another N-DCI is received, the N-DCI may be valid for a configurable time window, and/or the N-DCI may be valid within the same periodicity of the broadcast DCI. According to certain aspects, the N-DCI may be valid K subframes after it is received (e.g., 3 ms similar to enhanced interference management and traffic adaptation (eIMTA)). According to certain aspects, the N-DCI payload may indicate how long the N-DCI is valid. According to certain aspects, the eNB configuration may indicate validity of the N-DCI and/or the number of subframes K after which the N-DCI is received for which the N-DCI is valid.

Example Compressed N-DCI Coding

According to certain aspects, N-DCI may be sent using compressed coding. The information to be carried in N-DCI may be on the order of 150 bits in order to indicate RBs that have or potentially have interference and to indicate modulation order, precoding, rank, etc. In an example implementation, multiple N-DCI may be signaled from the same cell. The multiple N-DCI may carry different information. For example, the cell may signal a short N-DCI that carriers limited information and a long N-DCI that carries detailed information. The eNB may send both the short N-DCI and the long N-DCI, or the eNB may choose to signal either the short N-DCI or the long N-DCI and may rely on the UE to perform blind decoding. According to certain aspects, one N-DCI may carry resource allocation information, another N-DCI may carry transmission mode (TM) information, etc. In this manner, an N-DCI associated with a parameter that may provide NAIC information may be signaled. In another example implementation, N-DCI may be coded with best effort encoding of information bits—rather than worst case coding. For example, a common case may use an average of 200 bits and a worst case (e.g., corner case) may use 1000 bits. For best effort encoding, only the 200 bits may be used, and whatever information does not fit in the N-DCI may rely on blind decoding by the UE.

Example N-DCI Indication of Resource Allocation

According to certain aspects, N-DCIs may indicate which RBs and/or resource block groups (RBGs) have interference present or potentially have interference. A brute-force indication approach may use a bit for each RB to indicate whether interference is present or not. This type of approach may use a large number bits (e.g., 100 bits to indicate presence of interference on 100 RBs). In some cases, an N-DCI may not carry enough bits for this type of approach to be feasible.

According to certain aspects, the eNB may signal a bitmap indicating interference condition. In an example implementation, each bit in bitmap may correspond to a group of RBGs (e.g., 2, 3, or 4 RBGs). This approach may use fewer bits (e.g., 25 bits for 100 RBs) than a brute-force approach.

According to certain aspects, a further restriction may be applied to the resource allocation and the resource allocation may be signaled at coarser granularity. For example, a restriction similar to DCI format 1 c may be applied (e.g., for below 10 MHz, N_RB^step of 2, for above 10 MHz, N_RB^step of 4, with length a multiple of N_RB^Step). Alternatively, a restriction similar to physical resource block (PRB) bundling may be applied (e.g., further bundling of PRBs such that multiple PRBs are bundled in an assignment. According to certain aspects, the granularity for the coarser resource allocation signaling may be referred to as "N-RBG". N-RBG may be larger than an RBG.

According to certain aspects, when signaling at RBG or N-RBG level (e.g., in the bitmap), a binary bit value may indicate whether NAIC should be performed or not (e.g., a 1 may indicate to perform NAIC and a 0 may indicate to perform NAIC at best effort or not to perform NAIC). According to certain aspects, a binary bit value may also indicate which RB/RBG/N-RBG has interference (e.g., a 1 may indicate interference is present or is potentially present and a 0 may indicate no interference is present). According to certain aspects, a bit value of 1 may indicate that interference is as signaled and a bit value of 0 may indicate blind detection should be performed for the RB, RBG, and/or N-RBG.

According to certain aspects, resource allocation Type 2 may exploit frequency diversity, (e.g., UE can different RB in different slots in a subframe), for example, for broadcast messages such as SIB and/or paging. In an example implementation, resource allocation Type 2 may be restricted to only certain subframes. For example, resource allocation Type 2 may be restricted to subframes 0, 4, 5, and 9 for frequency division duplexing (FDD) and restricted to subframes 0, 1, 5, and 6 for time division duplexing (TDD). For other subframes resource allocation Type 2 may not be used with NAIC. Alternatively, resource allocation Type 2 may be restricted only to broadcast, not unicast, when NAIC is enabled. According to certain aspects, the restriction may be signaled to the receiver in order to allow more efficient operations (e.g., perform per slot IC processing rather than per subframe IC processing).

According to certain aspects, depending on where the N-DCI is transmitted (e.g., in a subframe), the interpretation of the N-DCI may be different. For example, if N-DCI is received on subframe 0, 4, 5, or 9 for FDD or subframe 0, 1, 5, or 6 for TDD, the N-DCI may be interpreted assuming resource allocation Type 2 or assuming both resource allocation Type 2 and Type 0 (e.g., RA Type 2 for broadcast, RA Type 0 for unicast). If N-DCI is received on other subframes, the N-DCI may be interpreted assuming RA Type 0 or RA Type 1. Alternatively, resource allocation type may be signaled in the N-DCI, for example, using 1 or 2 bits to indicate RA Type 0, Type 1, or Type 2.

Example Signaling of Modulation

According to certain aspects, the eNB may signal modulation order. Signaling of modulation may use two bits (e.g., to indicate quadrature phase shift keying (QPSK), 16 quadrature amplitude modulation (QAM), 64 QAM or 256 QAM). In an example implementation, signaling of modulation order may be combined with blind detection (e.g., 1 bit to indicate 3 levels). For example, a bit value of 0 may indicate QPSK or 16 QAM and a bit value of 1 may indicate QPSK or 64 QAM. The UE may perform blind decoding in order to determine whether the modulation is QPSK or 16/64 QAM.

According to certain aspects, there may be a limited set of modulations for all assignments (e.g., QPSK or 16 QAM for all N-RBGs with interference (e.g., indicated with a bit value of 1)). Alternatively, all assignments may have the same modulation (e.g., QPSK for all N-RBGs with interference (ones)).

Example Signaling of Transmission Mode

According to certain aspects, a transmission scheme signaling of a neighbor cell may be signaled. This information may be useful for NAIC operations. According to certain aspects, transmission mode may be signaled semi-statically or dynamically. For example, a restricted set of supported transmission modes may be semi-statically signaled. Alternatively, restricted transmission mode sets may be signaled per N-RBG, for example, using additional dynamic signaling (e.g., 2 bits).

According to certain aspects, N-DCI may indicate transmission schemes for subsequent subframes. Alternatively, transmission schemes may be subframe dependent. For example, in some subframes, transmission schemes may be demodulated reference signals (DM-RS) based; in other subframes, transmissions schemes may be cell-specific reference signal (CRS) based; and in still other subframes, transmission schemes may be DM-RS and CRS based, for example. According to certain aspects, dynamic signaling may be used to indicate which transmission schemes should be used for a subframe.

Example N-DCI Signaling with Carrier Aggregation

According to certain aspects, N-DCI may be signaled using a single component carrier (CC). Interference information may be indicated cross-carrier in systems supporting carrier aggregation (CA). In other words, interference information sent on one CC may be used for interference management on a different CC. In this case, there may be a fixed mapping of CC to carrier indicator field (CIF), for example, instead of a UE-specific mapping. According to certain aspects, interference information may be indicated cross-subframe. In this case, interference information sent in one subframe may be used interference management in another subframe.

According to certain aspects, different N-DCI indications may be sent on each CC. The UE may be semi-statically configured with information about which CCs may have N-DCI.

Example N-DCI Indication of MBSFN

According to certain aspects, N-DCI may indicate whether multicast-broadcast single frequency network (MBSFN) is enabled. For example, one bit may be included in the N-DCI to provide the indication. The indication may be signaled semi-statically, for example. This may be useful in cases where there is no backhaul exchange.

According to certain aspects, one bit may be included in the N-DCI to indicate whether DM-RS based PDSCH is transmitted in MBSFN subframes or whether multimedia broadcast-multicast service (MBMS) is transmitted in the MBSFN subframes. According to certain aspects, the indication may be provided by the same N-DCI bit signaling on which RBGs or subframes NAIC operations should be performed. According to certain aspects, if NAIC is to be signaled using enhanced physical downlink control channel (ePDCCH), then cross-subframe indication may be used since there is no ePDCCH in MBMS or UE fallback mode to no IC (or blind detection based IC) when N-DCI is received.

Example Interference Management Information Signaling Operations

Figure 7:
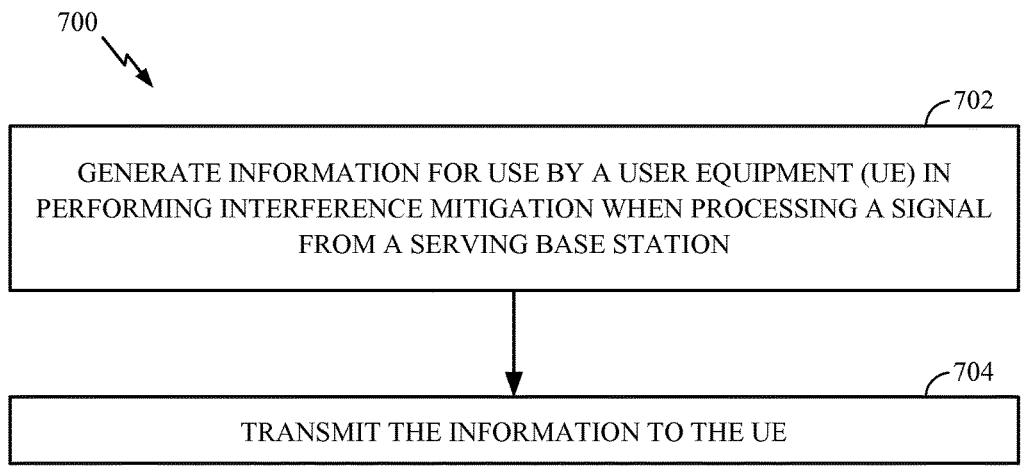
FIG. 7 illustrates example operations that may be performed by a base station (BS), in accordance with certain aspects of the disclosure.

FIG. 7 illustrates example operations 700 for wireless communications, in accordance with certain aspects of the disclosure. The operations 700 may be performed, for example, by an interfering or potentially interfering BS (e.g., such as macro cell 204 or femtocell 208). The operations 700 may begin, at 702, by generating information (e.g., NAIC information) for use by a UE in performing interference mitigation (e.g., suppression or cancelation) when processing a signal from a serving BS.

At 704, the interfering or potentially interfering BS may transmit (e.g., as N-DCI) the information to the UE. According to certain aspects, the interfering or potentially interfering BS may transmit multiple N-DCI (e.g., at least a first and a second type) with different information. One N-DCI may include more detailed information than the other one. For example, the first type of N-DCI may include resource allocation information and the second type of N-DCI may include transmission mode information. Alternatively, a limited amount of NAIC information may be provided in N-DCI using best effort encoding and blind decoding may be employed to obtain additional NAIC information. According to certain aspects, the N-DCI may indicate for how long the information is valid. According to certain aspects, the N-DCI may include a bitmap indicating RBGs or N-RBGs that include or potentially include interference, wherein N-RBGs are larger than RBGs. The one or more RBs or RBGs may be limited to a reduced number of possible modulation schemes for transmission from a set of available modulation schemes. According to certain aspects, separate N-DCIs may be transmitted on a respective plurality of CCs. The interfering or potentially interfering BS may semi-statically signal the CCs to the UE. According to certain aspects, the N-DCI may indicate a resource allocation type. According to certain aspects, the type of information conveyed in the N-DCI may depend, at least in part, on at least one of a subframe or a location within a subframe in which the N-DCI is transmitted.

According to certain aspects, the interfering or potentially interfering BS may generate an indication of how at least one of the interfering or potentially interfering BS or one or more neighbor cells transmit information for use by the UE in performing interference mitigation and transmits (e.g., in a SIB) the indication to the UE. According to certain aspects, the interfering or potentially interfering BS may indicate one or more configurations of N-DCI transmitted by the interfering BS and the one or more cells. According to certain aspects, the interfering or potentially interfering BS may receive, from the UE, one or more reports regarding M cells and may select the one or more cells based on the reported M cells. Alternatively, the interfering or potentially interfering BS may select the one or more cells based on PQI. According to certain aspects, the indication may indicate a reduced number of possible TMs from a set of available TMs to the UE for use in performing the interference mitigation, wherein the number of possible TMs are reduced by semi-static signaling.

Figure 8:
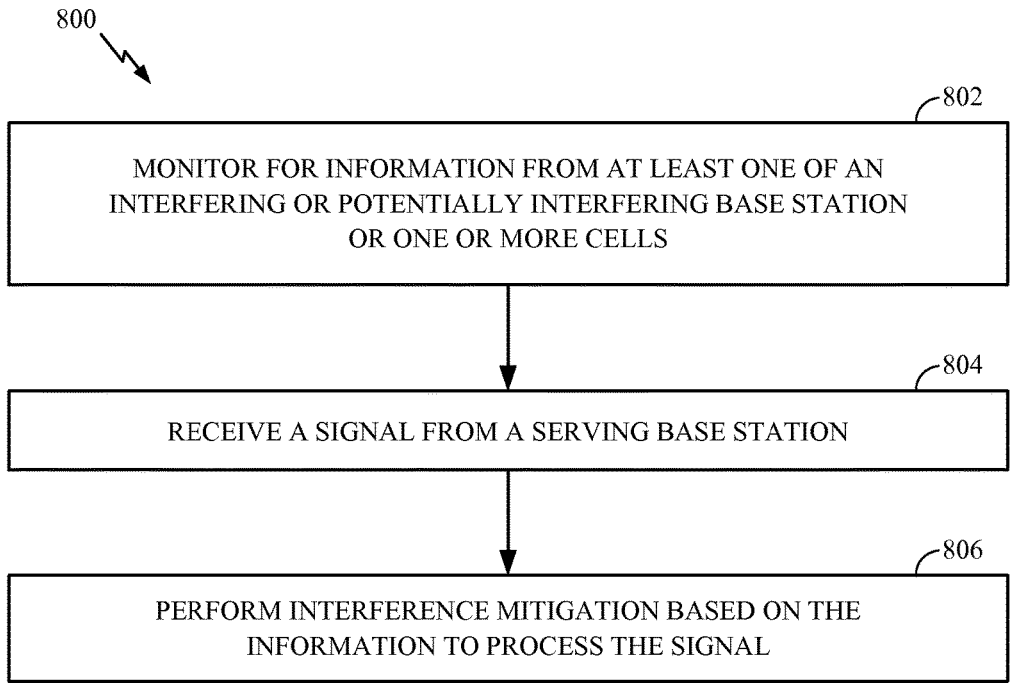
FIG. 8 illustrates example operations that may be performed by a UE, in accordance with certain aspects of the disclosure.

FIG. 8 illustrates example operations 800 for wireless communications, in accordance with certain aspects of the disclosure. The operations 800 may be performed, for example, by a UE (e.g., such as UE 206). The operations 800 may begin, at 802, by monitoring for information (e.g., N-DCI) from at least one of an interfering or potentially interfering BS or one or more cells. According to certain aspects, the UE may determine how many of the one or more cells to monitor for the information based on UE capability.

At 804, the UE may receive a signal from a serving BS.

At 806, the UE may perform interference mitigation based on the information to process the signal. In aspects, the UE may perform corresponding receiver side steps to the steps performed by the interfering or potentially interfering BS in FIG. 7. For example, in aspects, the method 800 may further comprise receiving (e.g., in a SIB) an indication, from the interfering or potentially interfering BS, of how at least one of the interfering or potentially interfering BS or one or more cells transmit information (e.g., N-DCI configurations). The UE may then monitor the interfering or potentially interfering BS and one or more cells based on the indication. The indication may indicate for how long the information is valid. Alternatively, the N-DCI may indicate for long the information is valid.

According to certain aspects, a limited amount of NAIC information may be received in N-DCI and the UE may employ blind decoding to obtain additional NAIC information. According to certain aspects, the N-DCI may include a bitmap indicating RBGs or N-RBGs that include or potentially include interference, wherein N-RBGs are larger than RBGs. According to certain aspects, the bitmap may further indicate pairs of modulation schemes and the UE may employ blind decoding to decide which modulation scheme is used. According to certain aspects, the information may be received on a first CC, but the interference mitigation may be performed on a second CC. Likewise, the information may be received in a first subframe, but the interference mitigation may be performed in a second subframe.

Figure 9:
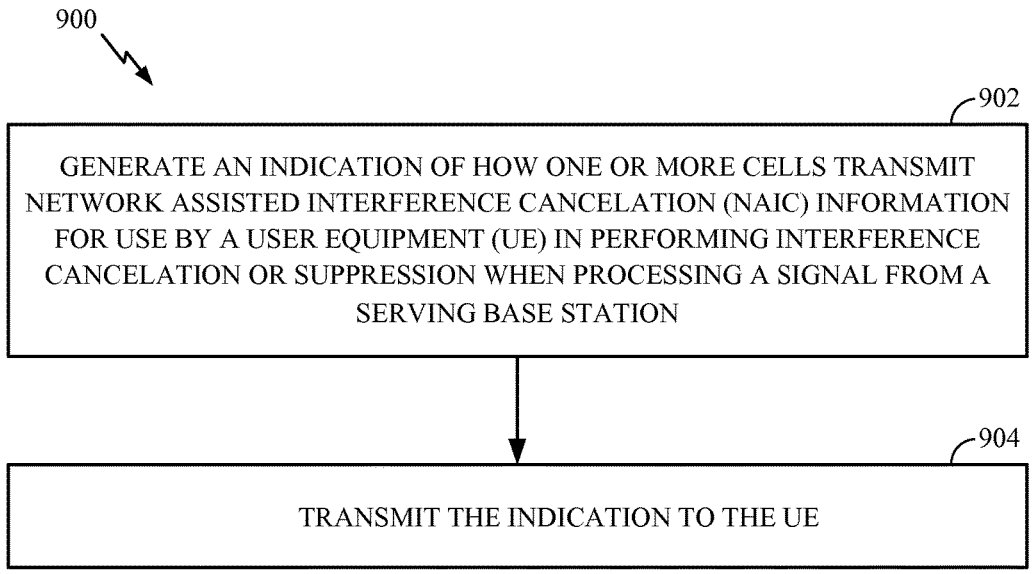
FIG. 9 illustrates example operations that may be performed by a BS, in accordance with certain aspects of the disclosure.

FIG. 9 illustrates example operations 900 for wireless communications, in accordance with certain aspects of the disclosure. The operations 900 may be performed, for example, by an interfering or potentially interfering BS (e.g., such as macro cell 204 or femtocell 208). The operations 900 may begin, at 902, by generating an indication of how one or more cells transmit NAIC information for use by a UE in performing interference cancelation or suppression when processing a signal from a serving BS. According to certain aspects, the indication may indicate one or more configurations of DCI by the one or more cells. The indication may also indicate for how long NAIC is valid. According to certain, the one or more cells are selected based on quasi co-location information.

At 904, the interfering or potentially interfering BS may transmit the indication to the UE. According to certain aspects, the BS may receive, from the UE, reports regarding M cells and the one or more cells may be selected based on the reported M cells.

Figure 10:
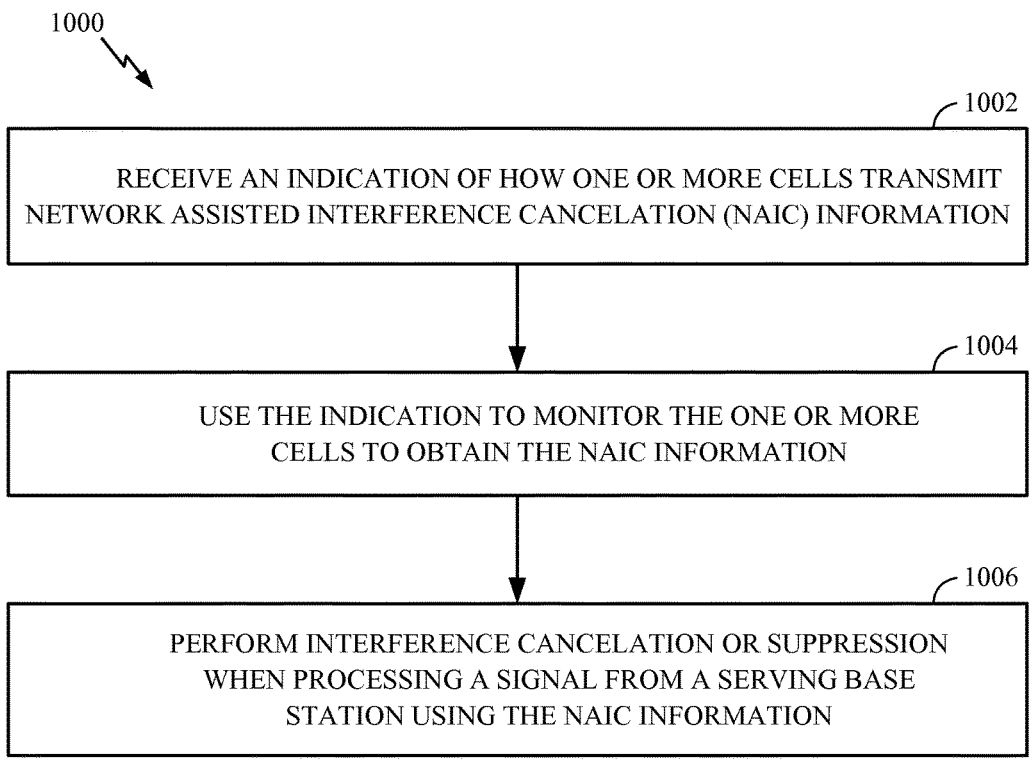
FIG. 10 illustrates example operations that may be performed by a UE, in accordance with certain aspects of the disclosure.

FIG. 10 illustrates example operations 1000 for wireless communications, in accordance with certain aspects of the disclosure. The operations 1000 may be performed, for example, by a UE (e.g., such as UE 206). The operations 1000 may begin, at 1002, by receiving (e.g., in a SIB) an indication of how one or more cells transmit NAIC information. According to certain aspects, the indication may indicate one or more configurations of DCI transmitted by the one or more cells. The indication may indicate (e.g., also indicate) for how long the NAIC information is valid.

At 1004, the UE may use the indication to monitor the one or more cells to obtain the NAIC information.

At 1006, the UE may perform interference cancelation or suppression when processing a signal from a serving base station using the NAIC information. According to certain aspects, the UE may send reports regarding M cells (e.g., neighbors) to the BS and the one or more cells may be selected based on the reported M cells. According to certain aspects, the UE may autonomously determine how many of the one or more cells to monitor for the NAIC information based on UE capability.

The present methods and apparatus may reduce number of bits required for NAIC signaling and/or reduce a number of hypotheses required to decode a signal received by a UE from a serving BS.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Figure 7A:
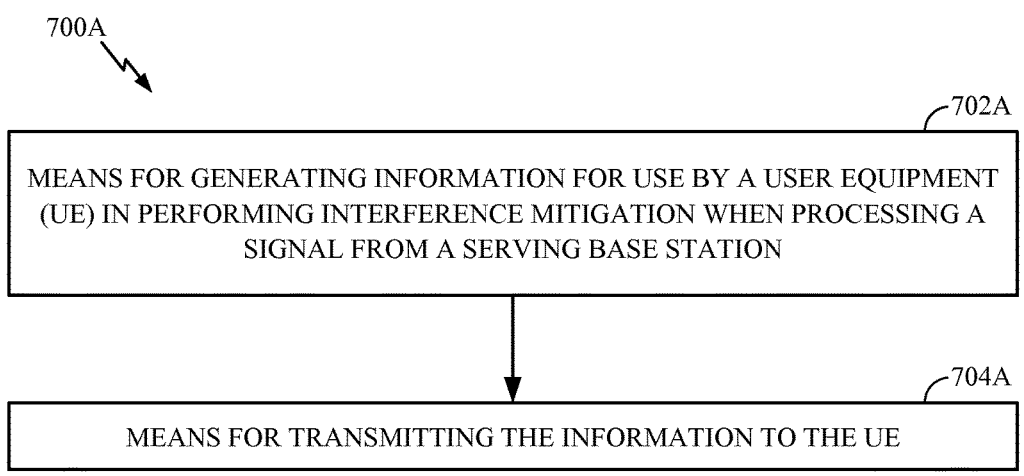
FIG. 7A illustrates example means capable of performing the operations shown in FIG. 7, in accordance with certain aspects of the present disclosure.
Figure 8A:
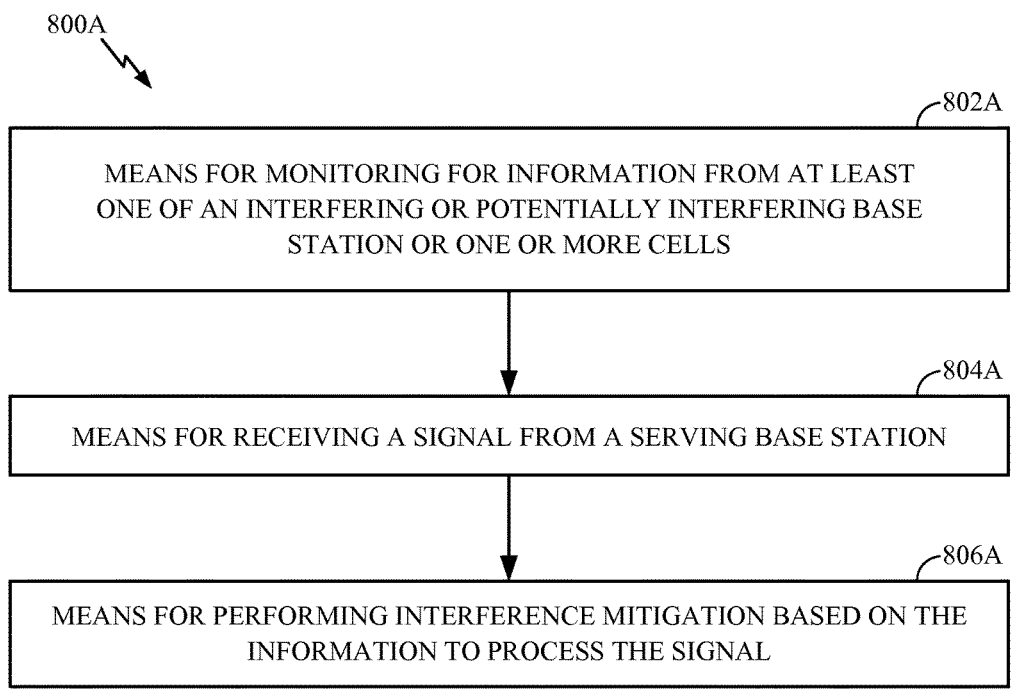
FIG. 8A illustrates example means capable of performing the operations shown in FIG. 8, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 and operations 800 illustrated in FIG. 8 correspond to means 700A in FIG. 7A and 800A in FIG. 8A, respectively.

For example, means for transmitting may comprise a transmitter (e.g., the transceiver 618) and/or an antenna(s) 620 of the eNB 610 illustrated in FIG. 6 or the transmitter (e.g., the transceiver 654) and/or antenna(s) 652 of the UE 650 illustrated in FIG. 6. Means for receiving may comprise a receiver (e.g., the transceiver 618) and/or an antenna(s) 620 of the eNB 610 illustrated in FIG. 6 or the receiver (e.g., the transceiver 654) and/or antenna(s) 652 of the UE 650 illustrated in FIG. 6. Means for processing, means for determining, means for performing, means for monitoring, means for generating, and/or means for employing may comprise a processing system, which may include one or more processors, such as the RX processor 656, the TX processor 668, and/or the controller/processor 659 of the UE 650 illustrated in FIG. 6 or the RX processor 670, the TX processor 616, and/or the controller/processor 675 of the eNB 610 illustrated in FIG. 6.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications by a base station, comprising:

transmitting an indication to a user equipment (UE) of one or more downlink control information (DCI) configurations used by at least one of the base station or one or more neighboring base stations to transmit network assisted interference cancellation (NAIC) information for use by the UE in performing interference mitigation when processing a signal from a serving base station; and transmitting one or more DCI including the NAIC information to the UE according to the indication, wherein the one or more DCI further includes an indication of how long the NAIC information is valid.

2. The method of claim 1, further comprising:
receiving, from the UE, one or more reports regarding M neighboring base stations, wherein the one or more neighboring base stations are selected based on the reported M neighboring base stations.

3. The method of claim 1, wherein the one or more neighboring base stations are selected based on quasi co-location information.

4. The method of claim 1, further comprising broadcasting the indication in a system information block (SIB).

5. The method of claim 1, wherein the transmitting comprises transmitting at least a first and a second type of DCI with different information.

6. The method of claim 1, wherein a limited amount of NAIC information is provided in DCI using best effort encoding.

7. The method of claim 1, wherein the DCI comprises a bitmap indicating resource block groups (RBGs) or a group of RBGs (N-RBGs) that include or potentially include interference, wherein N-RBGs are larger than RBGs.

8. The method of claim 7, wherein the RBGs or N-RBGs are limited to a reduced number of possible modulation schemes for transmission from a set of available modulation schemes.

9. The method of claim 1, wherein the indication is transmitted by semi-static signaling.

10. The method of claim 1, wherein separate DCIs are transmitted on a respective plurality of component carriers (CCs).

11. The method of claim 1, wherein the DCI is sent on one or more component carriers (CCs); and further comprising:
semi-statically signaling the one or more CCs to the UE.

12. The method of claim 1, wherein the DCI indicates a resource allocation type.

13. The method of claim 1, wherein the type of information conveyed in the DCI depends, at least in part, on at least one of a subframe or a location within a subframe in which the DCI is transmitted.

14. The method of claim 1, further comprising providing another indication of a restricted set of possible transmission modes (TMs), wherein the other indication is provided per resource block groups (RBGs), per set of RBGs, or per subframe via dynamic signaling.

15. The method of claim 14, wherein the transmission mode is associated with a type of reference signal.

16. A method of wireless communications by a user equipment (UE), comprising:
receiving an indication, from a base station of one or more downlink control information (DCI) configurations used by at least one of the base station or one or more neighboring base stations to transmit network assisted interference cancellation (NAIC) information for use by the UE in performing interference mitigation when processing a signal from a serving base station;
monitoring for the one or more DCI from the at least one of: the base station or one or more neighboring base stations based on the indication, wherein the one or more DCI includes an indication of how long the NAIC information is valid; and
performing interference mitigation based on the NAIC information to process a signal from the serving base station.

17. The method of claim 16, further comprising:
determining how many base stations to monitor for the information based on UE capability.

18. The method of claim 16, wherein the indication is received via broadcast in a system information block (SIB).

19. The method of claim 16, wherein a limited amount of NAIC information is received in DCI; and further comprising:
employing blind decoding to obtain additional NAIC information.

20. The method of claim 16, wherein the DCI comprises a bitmap indicating resource block groups (RBGs) or groups of RBGs (N-RBGs) that include or potentially include interference, wherein N-RBGs are larger than RBGs.

21. The method of claim 20, wherein the bitmap further indicates a reduced number of possible modulation schemes from a set of available modulation schemes; and further comprising:
employing blind decoding to decide which modulation scheme is used.

22. The method of claim 16, wherein the information is received on a first component carrier (CC) and the interference mitigation is performed on a second CC.

23. The method of claim 16, wherein the information is received in a first subframe and the interference mitigation is performed in a second subframe.

24. An apparatus of wireless communications by a base station, comprising:
means for generating an indication to a user equipment (UE) of one or more downlink control information (DCI) configurations used by at least one of the base station or one or more neighboring base stations to transmit network assisted interference cancellation (NAIC) information for use by the UE in performing interference mitigation when processing a signal from a serving base station; and
means for transmitting the indication to the UE; and
means for transmitting one or more DCI including the NAIC information to the UE according to the indication, wherein the one or more DCI further includes an indication of how long the NAIC information is valid.

25. The apparatus of claim 24, further comprising:
means for receiving, from the UE, one or more reports regarding M neighboring base stations, wherein the one or more neighboring base stations are selected based on the reported M neighboring base stations.

26. The apparatus of claim 24, wherein the one or more neighboring base stations are selected based on quasi co-location information.

27. The apparatus of claim 24, further comprising means for broadcasting the indication in a system information block (SIB).

28. The apparatus of claim 24, wherein the means for transmitting comprises means for transmitting at least a first and a second type of DCI with different information.

29. The apparatus of claim 24, wherein a limited amount of NAIC information is provided in DCI using best effort encoding.

30. The apparatus of claim 24, wherein the DCI comprises a bitmap indicating resource block groups (RBGs) or a group of RBGs (N-RBGs) that include or potentially include interference, wherein N-RBGs are larger than RBGs.

31. The apparatus of claim 30, wherein the RBGs or N-RBGs are limited to a reduced number of possible modulation schemes for transmission from a set of available modulation schemes.

32. The apparatus of claim 24, wherein the indication is transmitted by semi-static signaling.

33. The apparatus of claim 24, wherein separate DCIs are transmitted on a respective plurality of component carriers (CCs).

34. The apparatus of claim 24, wherein the DCI is sent on one or more component carriers (CCs); and further comprising:
means for semi-statically signaling the one or more CCs to the UE.

35. The apparatus of claim 24, wherein the DCI indicates a resource allocation type.

36. The apparatus of claim 24, wherein the type of information conveyed in the DCI depends, at least in part, on at least one of a subframe or a location within a subframe in which the DCI is transmitted.

37. An apparatus of wireless communications by a user equipment (UE), comprising:
means for receiving an indication, from a base station of one or more downlink control information (DCI) configurations used by at least one of the base station or one or more neighboring base stations to transmit network assisted interference cancellation (NAIC) information for use by the UE in performing interference mitigation when processing a signal from a serving base station;
means for monitoring for the one or more DCI from the at least one of: the base station or one or more neighboring base stations, wherein the one or more DCI includes an indication of how long the NAIC information is valid; and
means for performing interference mitigation based on the NAIC information to process a signal from the serving base station.

38. The apparatus of claim 37, further comprising means for determining how many base stations to monitor for the information based on UE capability.

39. The apparatus of claim 37, wherein the indication is received via broadcast in a system information block (SIB).

40. The apparatus of claim 37, wherein a limited amount of NAIC information is received in DCI; and further comprising:
means for employing blind decoding to obtain additional NAIC information.

41. The apparatus of claim 37, wherein the DCI comprises a bitmap indicating resource block groups (RBGs) or groups of RBGs (N-RBGs) that include or potentially include interference, wherein N-RBGs are larger than RBGs.

42. The apparatus of claim 41, wherein the bitmap further indicates a reduced number of possible modulation schemes from a set of available modulation schemes; and further comprising:
means for employing blind decoding to decide which modulation scheme is used.

43. The apparatus of claim 37, wherein the information is received on a first component carrier (CC) and the interference mitigation is performed on a second CC.

44. The apparatus of claim 37, wherein the information is received in a first subframe and the interference mitigation is performed in a second subframe.

* * * * *